United States Patent
Abe et al.

(10) Patent No.: US 10,228,644 B2
(45) Date of Patent: Mar. 12, 2019

(54) ADDITION-CURABLE LIQUID SILICONE RUBBER MIXTURE, ELECTROPHOTOGRAPHIC MEMBER, METHOD FOR PRODUCING THE SAME, AND FIXING APPARATUS

(71) Applicant: CANON KABUSHIKI KAISHA, Tokyo (JP)

(72) Inventors: Katsuya Abe, Tokyo (JP); Katsuhisa Matsunaka, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/877,777

(22) Filed: Jan. 23, 2018

(65) Prior Publication Data

US 2018/0217538 A1   Aug. 2, 2018

(30) Foreign Application Priority Data

Jan. 30, 2017  (JP) ................. 2017-014477
Dec. 22, 2017  (JP) ................. 2017-246304

(51) Int. Cl.
    *C08L 83/07*   (2006.01)
    *C08K 3/04*    (2006.01)
    *G03G 15/20*   (2006.01)

(52) U.S. Cl.
    CPC ........ *G03G 15/2057* (2013.01); *C08K 3/042* (2017.05); *C08K 2201/001* (2013.01); *G03G 15/2064* (2013.01)

(58) Field of Classification Search
    CPC ................. G03G 15/2057; C08L 83/04; C08L 2205/025; C08L 2203/20
    See application file for complete search history.

(56) References Cited

U.S. PATENT DOCUMENTS 8,655,238 B2   2/2014  Uno et al.
9,063,491 B2   6/2015  Matsunaka et al.
(Continued)

FOREIGN PATENT DOCUMENTS

JP   8-113713 A      5/1996
JP   2001-62380 A    3/2001
(Continued)

OTHER PUBLICATIONS

Sakakibara et al., U.S. Appl. No. 15/958,121, filed Apr. 20, 2018.
Abe et al., U.S. Appl. No. 15/877,763, filed Jan. 23, 2018.

*Primary Examiner* — David M. Gray
*Assistant Examiner* — Michael A Harrison
(74) *Attorney, Agent, or Firm* — Venable LLP (57) ABSTRACT

Provided is an electrophotographic member, the member including an elastic layer that is formed by graphite particles dispersed in a silicone rubber and has high thermal conductivity in the thickness direction. The electrophotographic member has a substrate and an elastic layer on the substrate, in which the elastic layer contains a cured product of an addition-curable liquid silicone rubber mixture including graphite particles, the dibutyl phthalate (DBP) oil absorption number of the graphite particles is from 80 cm$^3$/100 g to 150 cm$^3$/100 g, the thermal conductivity in the thickness direction of the elastic layer is from 1.1 W/(m·K) to 5.0 W/(m·K), and the modulus in tension of the elastic layer is from 0.1 MPa to 4.0 MPa.

20 Claims, 3 Drawing Sheets

(56) References Cited

U.S. PATENT DOCUMENTS

| | | |
|---|---|---|
| 9,134,663 B2 | 9/2015 | Matsunaka et al. |
| 9,268,273 B2 | 2/2016 | Miyahara et al. |
| 9,367,009 B2 | 6/2016 | Akiyama et al. |
| 9,665,049 B2 | 5/2017 | Oshima et al. |
| 2012/0034479 A1* | 2/2012 | Kimpara .............. G03G 15/162 428/473.5 |
| 2014/0248071 A1* | 9/2014 | Matsunaka ........ G03G 15/2017 399/328 |
| 2015/0185657 A1* | 7/2015 | Matsui ................. G03G 9/0833 430/105 |
| 2017/0205736 A1* | 7/2017 | Tedori .................... B29C 44/00 |

FOREIGN PATENT DOCUMENTS

| | | |
|---|---|---|
| JP | 2002-213432 A | 7/2002 |
| JP | 2005-292218 A | 10/2005 |
| JP | 2006-307233 A | 11/2006 |
| JP | 2013-140335 A | 7/2013 |
| JP | 5471350 B2 | 4/2014 |
| JP | 2015-121650 A | 7/2015 |
| JP | 2016-164660 A | 9/2016 |

* cited by examiner

ADDITION-CURABLE LIQUID SILICONE RUBBER MIXTURE, ELECTROPHOTOGRAPHIC MEMBER, METHOD FOR PRODUCING THE SAME, AND FIXING APPARATUS

BACKGROUND OF THE INVENTION

Field of the Invention

The present invention relates to an electrophotographic member used in a fixing apparatus for an electrophotographic apparatus such as a copying machine or a printer, a method for producing the member, and a fixing apparatus. Furthermore, the present invention relates to an addition-curable liquid silicone rubber mixture used for the electrophotographic member.

Description of the Related Art

In an electrophotographic apparatus, a fixing apparatus (thermal fixing apparatus) including a heating member and a pressing member arranged to face the heating member is used in order to fix an unfixed toner image formed on a recording medium to the recording medium.

Usually, in a fixing apparatus used for an electrophotographic system, rotating bodies as members for electrophotography, which form a pair such as a pair of a roller and a roller, a pair of a film and a roller, a pair of a belt and a belt, or a pair of a belt and a roller, are arranged so as to be capable of pressure contacting a recording medium. Then, a recording medium such as paper that holds an unfixed toner image is introduced into the pressure contacting site formed between these rotating bodies, and the unfixed toner image is heated to melt the toner. Thus, the image is fixed to the recording medium.

Here, a member that is in contact with the unfixed toner image held on the recording medium and heats the unfixed toner is referred to as heating member, and a member that is arranged to face the heating member and forms a fixing nip together with the heating member is referred to as pressing member. Examples of the heating member include a fixing roller, a fixing film, and a fixing belt, according to the shape of the member. An electrophotographic member that is used as a heating member may have an elastic layer containing a silicone rubber (see Japanese Patent No. 5471350). For such an electrophotographic member, it is preferable to increase the thermal conductivity of the elastic layer.

The inventors of the present invention conducted an investigation of various thermally conductive fillers so that the thermal conductivity of an elastic layer containing a cured product of an addition-curable liquid silicone rubber mixture can be increased. As a result, the inventors found that graphite can increase the thermal conductivity of the elastic layer more efficiently compared to, for example, thermally conductive fillers such as alumina. That is, graphite can impart high thermal conductivity to the elastic layer, even when used in a relatively small content, compared to alumina. However, it has been often difficult to sufficiently cure an addition-curable liquid silicone rubber mixture formed by incorporating graphite into an addition-curable liquid silicone rubber. The inventors of the present invention realized that in a case in which graphite is used for the purpose of increasing the thermal conductivity of an elastic layer containing a cured product of an addition-curable liquid silicone rubber, a technology for stably curing an addition-curable liquid silicone rubber needs to be developed.

SUMMARY OF THE INVENTION

One aspect of the present invention, is directed to providing an electrophotographic member including an elastic layer in which graphite (graphite particles) are dispersed in a silicone rubber, the elastic layer having high thermal conductivity in the thickness direction, and a method for producing the electrophotographic member.

Another aspect of the present invention, is directed to providing an addition-curable liquid silicone rubber mixture having sufficient curability. Still another aspect of the present invention, is directed to providing a fixing apparatus that contributes to the formation of high-quality electrophotographic images.

According to an aspect of the present invention, there is provided an electrophotographic member, including a substrate and an elastic layer on the substrate, the elastic layer containing a cured product of an addition-curable liquid silicone rubber mixture including graphite particles, the graphite particles having dibutyl phthalate (DBP) oil absorption number of from 80 $cm^3/100$ g to 150 $cm^3/100$ g, the elastic layer having a thermal conductivity in the thickness direction of from 1.1 W/(m·K) to 5.0 W/(m·K), and the elastic layer having a modulus in tension of from 0.1 MPa to 4.0 MPa.

According to an aspect of the present invention, there is provided an addition-curable liquid silicone rubber mixture, including an organopolysiloxane having an unsaturated aliphatic group, an organopolysiloxane having active hydrogen bonded to silicon, a catalyst, and graphite particles, the graphite particles having dibutyl phthalate (DBP) oil absorption number of from 80 $cm^3/100$ g to 150 $cm^3/100$ g, and the organopolysiloxane having active hydrogen bonded to silicon having a weight average molecular weight of from 5,500 to 65,000.

According to still another aspect of the present invention, there is provided a method for producing an electrophotographic member having a substrate and an elastic layer on the substrate, the method including curing a coating film of the addition-curable liquid silicone rubber mixture on the substrate, and thereby forming the elastic layer.

According to still another aspect of the present invention, there is provided a fixing apparatus having a heating member; and a pressing member arranged to face the heating member, in which the heating member is the electrophotographic member described above.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The inventors of the present invention conducted an investigation on the reason why there are occasions in which an addition-curable liquid silicone rubber mixture including graphite particles is not sufficiently cured. In the process of the investigation, the inventors confirmed that as the dibutyl phthalate (DBP) oil absorption number of the graphite particles used is larger, curing of the addition-curable liquid silicone rubber mixture is more noticeably inhibited. From such experimental results, the inventors speculated that the inhibition of curing of an addition-curable liquid silicone rubber mixture occurs due to the following reasons. That is, it was speculated that curing is inhibited because an organopolysiloxane having an active hydrogen atom bonded to a silicon atom, which functions as a crosslinking agent, is absorbed into the pores of graphite particles, and a hydrosilylation reaction does not proceed sufficiently. Thus, the inventors conducted an investigation on an assumption that when the molecular weight of the crosslinking agent is made large, it will be difficult for the crosslinking agent to be absorbed into the pores of graphite particles. As a result, the inventors found that by making the molecular weight of the crosslinking agent large, even an addition-curable liquid silicone rubber mixture including graphite particles that have a high DBP oil absorption number can be sufficiently cured, thus completing the present invention.

Meanwhile, Japanese Patent Application Laid-Open No. H08-113713 discloses an invention related to an electroconductive silicone rubber composition including a carbon-based electroconductive imparting agent such as carbon black or graphite. It is also described that in an electroconductive silicone rubber composition obtained by incorporating a large amount of a carbon-based electroconductive imparting agent into a silicone rubber, curability is lowered. However, since the carbon-based electroconductive imparting agent that is specifically used in Examples and Comparative Examples of Japanese Patent Application Laid-Open No. H08-113713 is carbon black only, nothing is specifically disclosed or suggested with regard to graphite.

An addition-curable liquid silicone rubber mixture according to an embodiment of the present invention includes an organopolysiloxane having an active hydrogen atom bonded to a silicon atom as a crosslinking agent for an addition-curable liquid silicone rubber, the organopolysiloxane having a weight average molecular weight of 5,500 to 65,000. Thereby, even if the addition-curable liquid silicone rubber mixture includes, for example, graphite particles having a high DBP oil absorption number value such as 80 to 150 $cm^3/100$ g, absorption of the crosslinking agent by the graphite particles is suppressed. As a result, it can be made difficult for the inhibition of curing of the addition-curable liquid silicone rubber mixture to occur. Furthermore, graphite particles having a high DBP oil absorption number can efficiently increase, particularly, the thermal conductivity of a silicone rubber. Therefore, the addition-curable liquid silicone rubber mixture according to an embodiment of the present invention can produce a silicone rubber having further increased thermal conductivity. Also, the addition-curable liquid silicone rubber mixture can produce an electrophotographic member that includes an elastic layer having further increased thermal conductivity.

Hereinafter, the present invention will be explained in detail.

(1) Configuration of Electrophotographic Member

An electrophotographic member according to an embodiment of the present invention will be explained using the drawings.

Figure 1A:
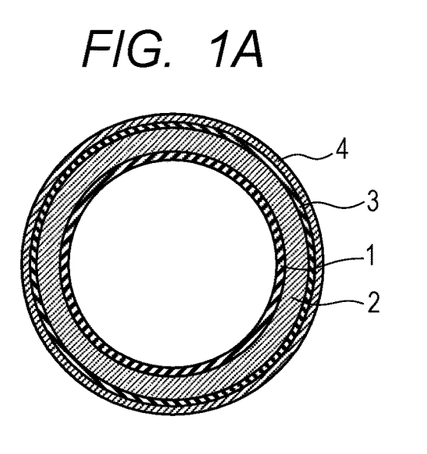
FIG. 1A is a cross-sectional view of an electrophotographic member according to an embodiment of the present invention, the electrophotographic member having an endless belt shape.
Figure 1B:
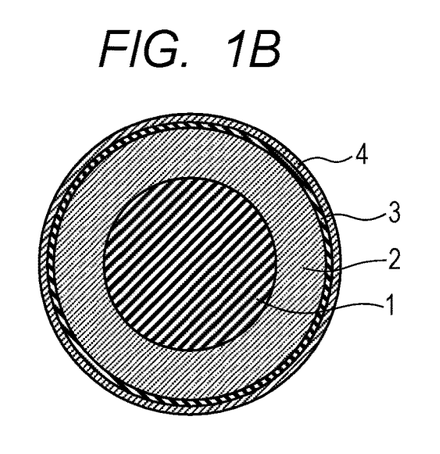
FIG. 1B is a cross-sectional view of the electrophotographic member according to an embodiment of the present invention, the electrophotographic member having a roller shape.

FIG. 1A and FIG. 1B are schematic outline cross-sectional views of the electrophotographic member according to the present embodiment. FIG. 1A illustrates an example of an electrophotographic member having an endless belt shape (hereinafter, also referred to as "belt for electrophotography"). FIG. 1B illustrates an example of an electrophotographic member having a roller shape (hereinafter, also referred to as "roller for electrophotography").

Figure 2:
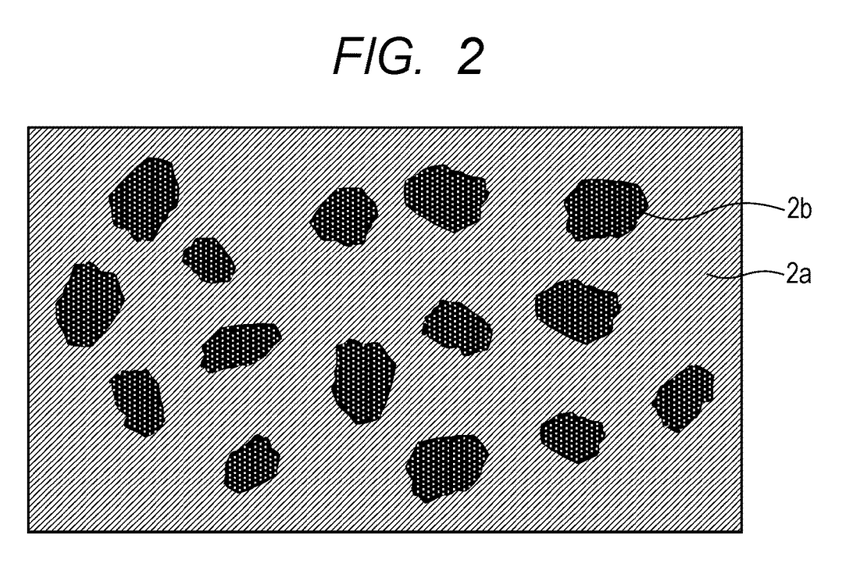
FIG. 2 is a cross-sectional view of an elastic layer of the electrophotographic member according to an embodiment of the present invention.

The belt for electrophotography illustrated in FIG. 1A has a substrate (base material) 1 having an endless belt shape, and an elastic layer 2 covering the outer circumferential surface of the substrate 1. Furthermore, the roller for electrophotography illustrated in FIG. 1B has a cylindrical or columnar substrate 1, and an elastic layer 2 covering the outer circumferential surface of the substrate. These members for electrophotography may also have a surface layer (release layer) 4 on the outer circumferential surface of the elastic layer 2. The members for electrophotography may also have an adhesive layer 3 between the elastic layer 2 and the surface layer 4. FIG. 2 is a schematic diagram of a cross-section in the circumferential direction of the elastic layer of the electrophotographic member related to FIG. 1A and FIG. 1B, that is, a cross-section in a direction that orthogonally intersects the longitudinal direction of the electrophotographic member. The elastic layer contains a cured product of an addition-curable liquid silicone rubber mixture, and the cured product contains a cured silicone rubber (cured product 2a of an addition-curable liquid silicone rubber) as a matrix, and graphite particles 2b that are dispersed in the matrix.

(2) Elastic Layer

The elastic layer can be formed by curing an addition-curable liquid silicone rubber mixture (addition-curable liquid silicone rubber composition) that includes at least graphite particles and an addition-curable liquid silicone rubber (component). That is, the elastic layer may be a cured product (solidified product) of an addition-curable liquid silicone rubber mixture, and can include at least a cured product 2a of an addition-curable liquid silicone rubber and graphite particles 2b.

Meanwhile, the addition-curable liquid silicone rubber may include an organopolysiloxane having an unsaturated aliphatic group, an organopolysiloxane having active hydrogen bonded to silicon as a crosslinking agent, and a catalyst (for example, a platinum compound).

The electrophotographic member (fixing roller, fixing film, fixing belt, or the like) can be used as any one or both of a heating member and a pressing member. In a case in which the electrophotographic member is used as a heating member, the elastic layer functions as a layer that imparts elasticity for conforming to the surface unevenness of paper at the time of fixing. Furthermore, in a case in which the electrophotographic member is used as a pressing member, the elastic layer functions as a layer that imparts elasticity for securing a nip width at the time of fixing. Upon expressing these functions, it is desirable to use an uncured silicone rubber as the base material for forming the elastic layer.

Uncured silicone rubbers are roughly classified into addition-curable liquid silicone rubbers and millable type silicone rubbers; however, in the present invention, an addition-curable liquid silicone rubber is used from the viewpoint that graphite particles or filler can be easily dispersed therein.

In the following description, the addition-curable liquid silicone rubber mixture used for the production of the elastic layer will be explained.

(2-1) Addition-Curable Liquid Silicone Rubber Mixture

An addition-curable liquid silicone rubber mixture includes an addition-curable liquid silicone rubber and graphite particles. The addition-curable liquid silicone rubber mixture may further include a filler that will be described below.

Subsequently, the various components included in the addition-curable liquid silicone rubber mixture will be explained in detail.

(2-1-1) Addition-Curable Liquid Silicone Rubber

The addition-curable liquid silicone rubber may include, as described above, (a) an organopolysiloxane having an unsaturated aliphatic group, (b) an organopolysiloxane having active hydrogen bonded to silicon, and (c) a platinum compound as a hydrosilylation (addition-curing) catalyst. The content of these addition-curable liquid silicone rubber components (including the platinum compound) in the addition-curable liquid silicone rubber mixture is preferably 50% by volume or more, and more preferably 70% by volume or more, from the viewpoint of imparting elasticity to the electrophotographic member.

Component (a): Organopolysiloxane Having Unsaturated Aliphatic Group

Regarding the organopolysiloxane having an unsaturated aliphatic group (hereinafter, may be referred to as "component (a)"), any organopolysiloxane having an unsaturated aliphatic group such as a vinyl group can all be used. For example, compounds respectively represented by the following Structural Formula 1 to Structural Formula 3 can be used as component (a).

Linear organopolysiloxane having any one or both of intermediate units selected from the group consisting of an intermediate unit represented by the formula: $R_1R_1SiO$ and an intermediate unit represented by the formula: $R_1R_2SiO$, and molecular terminals represented by the formula: $R_1R_1R_2SiO_{1/2}$ (see the following Structural Formula 1).

Structural Formula 1

In Structural Formula 1, $R_1$'s each independently represent an unsubstituted or substituted monovalent hydrocarbon group that does not include an unsaturated aliphatic group; $R_2$'s each independently represent an unsaturated aliphatic group; and m and n each independently represent an integer of 0 or greater, provided that m+n represents an integer of 1 or greater.

Branched organopolysiloxane having any one or both of intermediate units selected from an intermediate unit represented by the formula: $R_3SiO_{3/2}$ and an intermediate unit represented by the formula: $SiO_{4/2}$, and molecular terminals represented by the formula: $R_3R_3R_4SiO_{1/2}$ (see the following Structural Formula 2).

Structural Formula 2

In Structural Formula 2, $R_3$'s each independently represent an unsubstituted or substituted monovalent hydrocarbon group that does not include an unsaturated aliphatic group; $R_4$'s each independently represent an unsaturated aliphatic group; Y represents an organopolysiloxane; and p and q each independently represent an integer of 0 or greater, provided that p+q represents an integer of 1 or greater.

Linear organopolysiloxane having molecular terminals represented by the formula: $R_5R_5R_5SiO_{1/2}$, an intermediate unit represented by the formula: $R_5R_6SiO$, and optionally an intermediate unit represented by the formula: $R_5R_5SiO$ (see the following Structural Formula 3).

Structural Formula 3

In Structural Formula 3, $R_5$'s each independently represent an unsubstituted or substituted monovalent hydrocarbon group that does not include an unsaturated aliphatic group; $R_6$'s each independently represent an unsaturated aliphatic group; r represents an integer of 0 or greater; and s represents an integer of 3 or greater.

Regarding the unsubstituted or substituted monovalent hydrocarbon group that does not include an unsaturated aliphatic group and is bonded to a silicon atom, the hydrocarbon group being respectively represented by $R_1$, $R_2$, and $R_5$ in Structural Formulae 1 to 3, for example, the following may be mentioned.

Unsubstituted Hydrocarbon Group

An alkyl group (for example, a methyl group, an ethyl group, a propyl group, a butyl group, a pentyl group, or a hexyl group); or an aryl group (for example, a phenyl group).

Substituted Hydrocarbon Group

For example, a chloromethyl group, a 3-chloropropyl group, a 3,3,3-trifluoropropyl group, a 3-cyanopropyl group, or a 3-methoxypropyl group.

Here, it is preferable that $R_1$, $R_3$, and $R_5$ all represent a methyl group, from the viewpoint that synthesis and handling are easy, and production can be easily carried out. That is, as component (a), an organopolysiloxane in which methyl groups are bonded to the silicon atoms that constitute the main chain is suitably used.

Furthermore, regarding the unsaturated aliphatic group bonded to a silicon atom, the unsaturated aliphatic group being respectively represented by $R_2$, $R_4$, and $R_6$ in Structural Formulae 1 to 3, examples include a vinyl group, an allyl group, a 3-butenyl group, a 4-pentenyl group, and a 5-hexenyl group. Here, it is preferable that $R_2$, $R_4$, and $R_6$ all represent a vinyl group, from the viewpoint that synthesis or handling is easy and inexpensive, and a crosslinking reaction can be easily carried out.

Here, regarding the organopolysiloxane represented by Y in Structural Formula 2, another branched organopolysiloxane represented by Structural Formula 2 may be mentioned as an example. In this case, the branched organopolysiloxane represented by Structural Formula 2 can have a structure in which a plurality of similar branched organopolysiloxanes represented by Structural Formula 2 are bonded (siloxane bonding) via oxygen atoms.

A specific example of component (a) that is suitably used may be an organopolysiloxane having a structure in which methyl groups are directly bonded to the silicon atoms that constitute siloxane bonds of the main chain, and unsaturated aliphatic groups are introduced into side chains or molecular terminals. More specific examples include organopolysiloxanes respectively represented by the following Structural Formula 4 and Structural Formula 5. Among them, the organopolysiloxane having unsaturated aliphatic groups at the molecular terminals, the organopolysiloxane being represented by Structural Formula 5, is more preferred because the compound can be easily synthesized and is inexpensive.

Structural Formula 4

In Structural Formula 4, $R_6$'s each independently represent an unsaturated aliphatic group; r represents an integer of 0 or greater; and s represents an integer of 3 or greater.

Structural Formula 5

In Structural Formula 5, $R_2$'s each independently represent an unsaturated aliphatic group; and m represents a positive integer.

Regarding component (a), one kind of compound may be used alone, for two or more kinds thereof may be used in combination. For example, a mixture of the organopolysiloxane represented by Structural Formula 4 and the organopolysiloxane represented by Structural Formula 5 may be used as component (a).

From the viewpoint of obtaining easier moldability of the addition-curable liquid silicone rubber mixture, the weight average molecular weight of component (a) is preferably, for example, 20,000 to 80,000, and the kinematic viscosity at a temperature of 25° C. is preferably, for example, 1,000 to 30,000 mm²/sec.

The weight average molecular weight of component (a) can be measured as the weight average molecular weight measured by gel permeation chromatography (GPC) and calculated relative to polystyrene standards.

Here, the weight average molecular weight of component (a) can be measured using a method for measuring the molecular weight distribution by GPC, under the following conditions.

A column is stabilized inside a heat chamber at a temperature of 40° C., and toluene as a solvent is caused flow through the column at this temperature at a flow rate of 1 mL per minute. 100 μL of a toluene sample solution of component (a), which has been prepared at a sample concentration (concentration of component (a)) of 0.3% by mass is injected into the column, and the measurement of molecular weight of the sample is performed. Upon the measurement of molecular weight of the sample, the molecular weight distribution of the sample is calculated from the relation between the logarithmic value of a calibration curve produced using various kinds of monodisperse polystyrene standard samples (trade name: TSKgel standard polystyrene "0005202" to "0005211", manufactured by Tosoh Corp.), and the retention time. As the GPC apparatus, a GPC gel permeation chromatography analyzer (trade name: HLC8220, manufactured by Tosoh Corp.) is used, and as the detector, a differential refractive index detector (trade name: RI-8020, manufactured by Tosoh Corp.) is used. Regarding the column, three units of a commercially available polystyrene gel column (trade name: SHODEX GPC LF-804, manufactured by Showa Denko K.K.) are used in combination.

Furthermore, the kinematic viscosity η (mm²/sec) of the organopolysiloxane having an unsaturated aliphatic group can be calculated from the following Calculation Formula 1 using the viscosity (consistency) μ (mPa·s) measured by means of, for example, a rotary viscometer (trade name: RV1, manufactured by Eko Instruments Co., Ltd.) or the like.

$$\eta = \mu/\rho \qquad \text{Calculation Formula 1}$$

Here, ρ represents the density, and in the case of an organopolysiloxane, ρ is 0.97 g/cm³ at normal temperature and normal pressure (for example, a temperature of 25° C. and a pressure of 1013 hPa).

Regarding the addition-curable liquid silicone rubber, the amount of the unsaturated aliphatic groups in component (a) is preferably from 0.1 mol % to 2.0 mol % with respect to 1 mol of silicon atoms in component (a). More preferably, the amount is from 0.2 mol % to 1.0 mol % with respect to 1 mol of silicon atoms.

Component (b): Organopolysiloxane Having Active Hydrogen Bonded to Silicon (Crosslinking Agent)

An organopolysiloxane having active hydrogen bonded to silicon (hereinafter, may be referred to as component (b)) functions as a crosslinking agent that forms a crosslinked structure through a hydrosilylation reaction with the unsaturated aliphatic groups in component (a) as a result of catalytic action of a platinum compound.

Regarding component (b), any organopolysiloxane having Si—H bonds can all be used; however, for example, an organopolysiloxane that satisfies the following conditions can be suitably used. Meanwhile, regarding component (b), one kind of compound may be used alone, or (a mixture of) two or more kinds may be used in combination.

From the viewpoint of forming a crosslinked structure through a reaction with an organopolysiloxane having an unsaturated aliphatic group, a compound in which the number of hydrogen atoms bonded to silicon atoms is 3 or greater on the average in one molecule.

A compound in which the organic group bonded to a silicon atom is, for example, an unsubstituted or sub- stituted monovalent hydrocarbon group such as mentioned above. Meanwhile, from the viewpoint that synthesis and handling are easy, this organic group is preferably a methyl group.

The siloxane skeleton (—Si—O—Si—) may be any of a linear skeleton, a branched skeleton, and a cyclic skeleton; however, from the viewpoint that synthesis is easy, a linear siloxane skeleton is preferred.

The Si—H bond may exist in any of the siloxane units in the molecule.

Specific examples of component (b) include a linear organopolysiloxane represented by the following Structural Formula 6, and a cyclic crosslinking agent silicone polymer represented by the following Structural Formula 7.

Structural Formula 6

In Structural Formula 6, $R_7$'s each independently represent an unsubstituted or substituted monovalent hydrocarbon group that does not include an unsaturated aliphatic group; t represents an integer of 0 or greater; and u represents an integer of 3 or greater.

Structural Formula 7

In Structural Formula 7, $R_8$'s each independently represent an unsubstituted or substituted monovalent hydrocarbon group that does not include an unsaturated aliphatic group; v represents an integer of 0 or greater; and w represents an integer of 3 or greater.

$R_7$'s and $R_8$'s may all represent an unsubstituted or substituted monovalent hydrocarbon group that does not include an unsaturated aliphatic group, the hydrocarbon group being bonded to a silicon atom, as described above in connection with Structural Formulae 1 to 3. Particularly, above all, it is preferable that in regard to $R_7$'s in Structural Formula 6 and $R_8$'s in Structural Formula 7, 50% or more of $R_7$'s or $R_8$'s represent a methyl group, and it is more preferable that all of $R_7$'s and $R_8$'s represent a methyl group, from the viewpoint that synthesis or handling is easy, and excellent heat resistance is obtained.

In regard to the addition-curable liquid silicone rubber mixture according to an embodiment of the present invention, the weight average molecular weight of component (b) is from 5,500 to 65,000. If the weight average molecular weight of component (b) is smaller than 5,500, component (b) becomes easily absorbed by graphite particles, and it is difficult to sufficiently suppress the inhibition of curing of the addition-curable liquid silicone rubber mixture. Furthermore, if the weight average molecular weight of component (b) is larger than 65,000, the kinematic viscosity of the addition-curable liquid silicone rubber mixture becomes too high, and thereby moldability may deteriorate. The weight average molecular weight of component (b) is more preferably from 6,000 to 60,000.

The weight average molecular weight of component (b) can be measured by the same method as that used for the weight average molecular weight of component (a) described above.

Furthermore, the kinematic viscosity at 25° C. of component (b) is preferably, for example, from 130 mm$^2$/sec to 9,000 mm$^2$/sec.

In order to calculate the kinematic viscosity, the viscosity (consistency) μ in the afore-mentioned calculation formula (1) is measured. Examples of measuring methods for the viscosity μ in the calculation formula (1) includes following method. That is, first, on a sample plate of the afore-mentioned rotary viscometer, a sample of which the viscosity is to be measured, such as addition-curable liquid silicone rubber composition, is coated. Then, a rotation plate is put on the sample plate with a gap of 105 μm to sandwich the sample coated on the sample plate between the rotation plate and the sample plate. Next, sharing force is applied to the sandwiched sample by rotating the rotation plate and the viscosity of the sample is measured. The share rate is controlled as to increase from 0 s$^{-1}$ to 20 s$^{-1}$ at the rate of 0.2 s$^{-1}$ per second, and then decrease from 20 s$^{-1}$ to 0 s$^{-1}$ at the rate of 0.2$^{-1}$ per second. Among the measured values during the measurement, the maximum value is employed as a representative value.

Regarding the addition-curable liquid silicone rubber, it is preferable that the amount of active hydrogen groups bonded to silicon in component (b) is from 1 mol % to 10 mol % with respect to 1 mol of silicon atoms in component (b).

(c) Catalyst

Regarding the hydrosilylation (addition curing) catalyst, for example, a platinum compound can be used. Regarding this platinum compound, for example, the following compounds can be used: platinum carbonylcyclovinylmethylsiloxane complex vinylmethylcyclosiloxane, platinum divinyltetramethyldisiloxane complex, and the like.

(2-1-2) Graphite Particles

Regarding the particles of graphite, particles of artificial graphite and particles of natural graphite can all be used. Regarding the particles of natural graphite, a product obtained by pulverizing naturally occurring graphite into microparticles can be used. Furthermore, artificial graphite is a product obtained by pulverizing coke that serves as a raw material, subsequently molding the resultant into a rod shape or the like, and graphitizing the resultant at a high temperature. A product obtained by pulverizing artificial graphite that has been graphitized as such and classifying the pulverization product can be used. Meanwhile, the graphite has a hexagonal plate-shaped crystal, and also has a layered structure. Graphite particles may be used singly, or two or more kinds thereof may be used in combination.

(i) Oil Absorption Number Characteristics

The oil absorption number characteristics of the graphite particles are shown by the DBP oil absorption number measured according to the method stipulated in JIS K6217-4:2008 (Carbon black for rubber—Basic characteristics—Chapter 4: Method for determining oil absorption number (including compressed materials)).

As a specific measurement method, for example, the following method may be mentioned. That is, first, 20 g of graphite particles are measured using an oil absorption number measuring apparatus (trade name: S410C, manufactured by Asahi Souken Co., Ltd.), and the graphite particles are introduced into a mixing chamber of the apparatus. In the mixing chamber, the graphite particles are mixed by a motor-driven rotating blade at a speed of 125 rotations/minute, DBP is added dropwise thereto at a constant dropping rate to be absorbed by the graphite particles, and the torque at that time can be measured. The torque measured at that time increases with the lapse of time; however, when the graphite particles cannot further absorb DBP, the peripheries of the graphite particles are covered with DBP, and the torque rapidly decreases. The time point at which the torque decreases to 70% of the maximum torque is considered as the termination point, and from the amount of dropping of DBP at that time, the DBP oil absorption number ($cm^3/100$ g) for the graphite particles is calculated.

In a case in which graphite particles are included in a silicone rubber in a dispersed state as is the case of the elastic layer illustrated in FIG. 2, the DBP oil absorption number may be measured after the graphite particles are isolated from the silicone rubber by the following method. That is, it is desirable that the silicone rubber including graphite particles is heated to a high temperature of 500° C. or higher in a nitrogen atmosphere, the silicone rubber is calcified and removed, and thereby the graphite particles are isolated, and the DBP oil absorption number of the graphite particles is measured.

In regard to the addition-curable liquid silicone rubber mixture according to the present embodiment, regarding the graphite particles, graphite particles having a DBP oil absorption number of from 80 $cm^3/100$ g to 150 $cm^3/100$ g are incorporated. Graphite particles having a DBP oil absorption number in the range of 80 to 150 $cm^3/100$ g can impart high thermal conductivity (for example, 1.1 W/(m·K) or higher) to a cured product of an addition-curable liquid silicone rubber mixture, even if the content of the graphite particles in the addition-curable liquid silicone rubber mixture is, for example, a small amount such as 30% by volume or less. Furthermore, even if graphite particles having such a high DBP oil absorption number are used, the addition-curable liquid silicone rubber mixture according to the present embodiment does not easily cause inhibition of curing because component (b) is not easily incorporated into the graphite particles by adjusting the weight average molecular weight of component (b) as a crosslinking agent has been adjusted to a value of from 5,500 to 65,000.

(ii) Content (Filling Amount)

The content of graphite particles in the addition-curable liquid silicone rubber mixture is preferably adjusted to 13% to 30% by volume with respect to the total amount (100% by volume) of the silicone rubber mixture. When the content of the graphite particles is 13% by volume or more, an elastic layer having a high thermal conductivity can be easily formed. When the content of the graphite particles is 30% by volume or less, an elastic layer having adequate hardness can be easily formed, and appropriate stress is likely to be applied to the silicone rubber.

Furthermore, when the addition-curable liquid silicone rubber mixture is cured and thereby produced into, for example, an elastic layer, it is preferable that the content (filling amount) of the graphite particles is adjusted as follows, for the reason described above. That is, the content of the graphite particles in the elastic layer is preferably from 13% by volume to 30% by volume with respect to the total volume of the elastic layer.

The respective contents of the cured product of the addition-curable liquid silicone rubber and the graphite particles in the elastic layer can be measured using a thermogravimetric analyzer (for example, TGA/SDTA851e (trade name), manufactured by Mettler Toledo International, Inc.).

Specifically, a portion equivalent to about 20 to 50 mg of an elastic layer that is cut out as a sample from an electrophotographic member using a razor or the like, and the content is measured using a pan made of alumina.

First, the sample placed on a pan made of alumina is introduced into a sample chamber, and the temperature of the sample chamber is elevated from room temperature (25° C.) to 1,100° C. at a rate of temperature increase of 20° C./min in a nitrogen atmosphere. Then, the sample is maintained constant for 30 minutes at 1,100° C. in a nitrogen atmosphere, and thus the addition-curable liquid silicone rubber (cured product) is thermally decomposed. Subsequently, while the temperature is maintained at 1,100° C., graphite particles are combusted in a high-temperature oxygen atmosphere. From the measurement mass that is reduced at the time, the mass ratio of the addition-curable liquid silicone rubber (cured product) and the graphite particles included in the sample can be respectively checked. The respective volumes of the addition-curable liquid silicone rubber (cured product) and the graphite particles are calculated from the measurement results (mass) and densities, and the contents of these components in the elastic layer can be calculated.

(iii) Average Particle Size

The average particle size of the graphite particles is preferably from 3 μm to 40 μm. When the average particle size is 3 μm or larger, even if the graphite particles are added in a large amount for the purpose of enhancing the thermal conductivity, the increase of the viscosity of an addition-curable liquid silicone rubber before curing can be easily suppressed. Furthermore, when the average particle size is 40 μm or less, roughening of the rubber surface of the electrophotographic member and an image quality with granular feeling and unevenness can be easily suppressed.

Furthermore, it is more preferable that from the viewpoint of viscosity, the average particle size of the graphite particles is adjusted to 5 μm or greater, and from the viewpoint of hardness uniformity, the average particle size is adjusted to 30 μm or less.

The average particle size of the graphite particles can be measured using a laser diffraction/scattering type particle size distribution analyzer (trade name: MT3100II, MicrotracBEL Corp.). Here, the average particle size of the graphite particles means the so-called the median diameter. Meanwhile, the median diameter means the particle size obtainable at an accumulation of 50% in a graph exhibiting the volume average particle size as a cumulative distribution when a particle size distribution analysis is performed.

(2-1-3) Filler

The addition-curable liquid silicone rubber mixture may include, in addition to the graphite particles, titanium oxide, iron oxide, silica, or the like as filler for the purpose of enhancing thermal resistance or durability. The type and content of the filler in the addition-curable liquid silicone rubber mixture may be appropriately selected and adjusted to the extent that the effects of the present invention are not impaired.

(2-2) Thickness of Elastic Layer

In regard to the belt for electrophotography, it is preferable that the thickness of the elastic layer is adjusted to a value of from 0.1 mm to 1.0 mm, from the viewpoint of imparting heat transferability and elasticity. Furthermore, in regard to the roller for electrophotography, the thickness of the elastic layer is preferably adjusted to a value of from 2.0 mm to 5.0 mm, and more preferably to a value of from 2.5 mm to 4.0 mm, from the viewpoint of imparting heat transferability and elasticity.

(2-3) Thermal Conductivity in Thickness Direction of Elastic Layer

The thermal conductivity ($\lambda$) in the thickness direction of the elastic layer is adjusted to a value of from 1.1 W/(m·K) to 5.0 W/(m·K). When the thermal conductivity is adjusted to be 1.1 W/(m·K) or higher, heat transfer from the back surface to the front surface of the elastic layer in an electrophotographic member can be achieved more efficiently. Here, the front surface of the electrophotographic member refers to the surface that is brought into contact with toner. It is more desirable to have higher thermal conductivity; however, from the viewpoint of hardness or strength of the elastic layer, the thermal conductivity that can be achieved in reality is 5.0 W/(m·K) or lower. The method for measuring thermal conductivity will be described below.

(2-4) Modulus in Tension of Elastic Layer

The modulus in tension of the elastic layer is set to a value of from 0.1 MPa to 4.0 MPa. When the modulus in tension is 0.1 MPa or higher, it may be considered that the addition-curable liquid silicone rubber that constitutes the elastic layer has been sufficiently cured. When the modulus in tension is 4.0 MPa or lower, elasticity can be imparted to the electrophotographic member. The method for measuring the modulus in tension will be described below.

(2-5) Method for Forming Elastic Layer

The elastic layer can be formed by methods such as a ring coating method, a blade coating method, a nozzle coating method, and a mold casting method (see Japanese Patent Application Laid-Open No. 2001-62380 and Japanese Patent Application Laid-Open No. 2002-213432). When an addition-curable liquid silicone rubber mixture supported on a substrate is heated and crosslinked by using these methods, an elastic layer can be formed on the substrate. Meanwhile, ultraviolet radiation can also be used at the time of curing the addition-curable liquid silicone rubber mixture.

(3) Substrate (Base Material)

In regard to the belt for electrophotography, a substrate having an endless belt shape is used. Regarding the material, a metal such as a nickel alloy or stainless steel; or a resin such as polyimide can be used. On the outer circumferential surface of the substrate, an adhesive layer for imparting a function of enhancing the adhesiveness between the substrate and the elastic layer can be provided. That is, the elastic layer is provided on the outer circumferential surface of the substrate, and another layer such as an adhesive layer can be provided between the elastic layer and the substrate. On the inner circumferential surface of the substrate, a protective layer for suppressing abrasion caused by contact with a heater, or a sliding layer for enhancing the sliding properties between the substrate and a heater can be provided.

In regard to the roller for electrophotography, a columnar or cylindrical substrate is used. Regarding the material, a metal such as aluminum or iron, an alloy, or a heat-resistant resin such as polyimide can be used.

(4) Surface Layer (Release Layer) of Electrophotographic Member

Regarding the surface layer as a release layer, it is preferable that, for example, a fluororesin is incorporated therein in order to make it difficult for toner to adhere to the surface of the electrophotographic member. Specific examples of the fluororesin include the following: a tetrafluoroethylene-perfluoro(alkyl vinyl ether) copolymer (PFA), polytetrafluoroethylene (PTFE), and a tetrafluoroethylene-hexafluoropropylene copolymer (FEP).

Furthermore, a filler may also be incorporated into the surface layer for the purpose of controlling thermal properties, to the extent that moldability or releasability is not impaired.

It is preferable that the thickness of the surface layer is adjusted to a value of from 10 μm to 100 μm. When the thickness of the surface layer is 10 μm or greater, sufficient durability is easily obtained. When the thickness is 100 μm or less, the surface layer maintains elasticity of the elastic layer when the surface layer is laminated on the elastic layer, and the surface hardness of the electrophotographic member (for example, a heating member) becoming too high can be easily suppressed.

(4-1) Method for Forming Surface Layer

The method for forming the surface layer is not particularly limited, and for example, the following methods can be used. That is, a method of molding a fluororesin into a tube shape, and coating the molded fluororesin on the elastic layer, with an adhesive layer interposed therebetween; and a method of coating the surface of the elastic layer with microparticles of a fluororesin directly or using a coating material obtained by dispersing the microparticles in a solvent, subsequently drying and melting the microparticles thereon, and firing the microparticles, may be used. In the following description, these methods will be explained in more detail.

(4-1-1) Formation of Surface Layer by Covering with Fluororesin Tube

The inner surface of the fluororesin tube is subjected to a sodium treatment, an excimer laser treatment, an ammonia treatment or the like in advance so as to activate the surface, and thereby adhesiveness can be enhanced.

Figure 3:
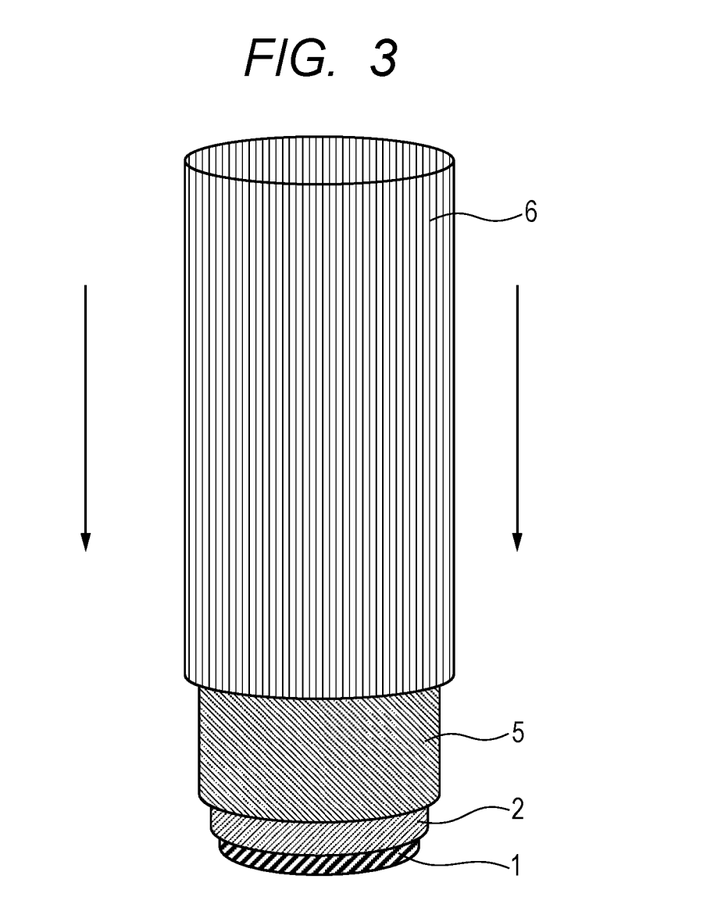
FIG. 3 is a schematic diagram of an example for illustrating a process of laminating a fluororesin surface layer.

FIG. 3 is a schematic diagram of an example for explaining a process of covering an elastic layer 2 with a fluororesin tube 6 as a surface layer, with an adhesive layer 5 interposed therebetween.

Specifically, an adhesive is applied on the surface of the elastic layer 2 described above, and thus an adhesive layer 5 is formed. The adhesive will be described in detail below. The outer surface of this adhesive layer 5 is covered with the fluororesin tube 6 as a surface layer, and thus the fluororesin tube 6 is laminated thereon.

Regarding the adhesive, it is preferable to use an addition-curable silicone rubber having a self-adhesive component incorporated therein. Regarding this silicone rubber, specifically, a silicone rubber containing an organopolysiloxane having a plurality of unsaturated aliphatic groups, which are represented by vinyl groups, in the molecular chain; a hydrogen organopolysiloxane; and a platinum compound as a crosslinking catalyst, can be used. This silicone rubber is cured by an addition reaction. Regarding an adhesive formed from such an addition-curable silicone rubber, those existing adhesives can be used.

Meanwhile, it will not be necessary in a case in which the substrate 1 is a core bar capable of maintaining the shape; however, when a substrate 1 having a thin thickness such as a resin belt or a metal sleeve, which is used for a belt-shaped electrophotographic member, is used, it is desirable that the substrate 1 is externally fitted on a core and maintained thereon in order to prevent deformation at the time of processing.

The method for covering with the fluororesin tube 6 is not particularly limited; however, a method of covering with the fluororesin tube 6 using an adhesive as a lubricating agent, a method of expanding the fluororesin tube 6 outward and covering with the expanded fluororesin tube, or the like can be used.

After the covering, any excessive adhesive remaining between the elastic layer 2 and the fluororesin tube 6 can be removed by pulling out using a device that is not shown. The thickness of the adhesive layer 5 after pulling out is preferably 20 μm or less. When the thickness of the adhesive layer 5 is 20 μm or less, an increase in hardness of the electrophotographic member can be easily suppressed. In a case in which the electrophotographic member is used as a heating member, the adhesive layer has satisfactory conformity to the surface unevenness of paper, and even in a case in which the electrophotographic member is used as a pressing member, the nip width does not become narrow at the time of fixing, and satisfactory fixed images can be easily obtained. Next, the assembly is heated for a predetermined time in a heating unit such as an electric furnace to thereby cure the adhesive layer 5, and the two ends are processed into a desired length as necessary. Thus, the electrophotographic member of the present invention can be obtained.

(4-1-2) Formation of Surface Layer Using Fluororesin Coating

For the processing of coating with a fluororesin for forming a surface layer, methods such as electrostatic coating with fluororesin microparticles and spray coating with a fluororesin coating material can be used.

In the case of using an electrostatic coating method, first, the inner surface of a mold is subjected to electrostatic coating with fluororesin microparticles, and the mold is heated to a temperature higher than or equal to the melting point of the fluororesin. Thus, a thin film of the fluororesin is formed on the inner surface of the mold. Subsequently, the inner surface is adhesive-treated, a substrate is inserted into the mold, and an elastic layer material is injected between the substrate and the fluororesin. After the elastic layer material is cured, the elastic layer is released from the mold together with the fluororesin, and thereby the electrophotographic member of the present invention can be obtained.

In the case of using spray coating, a coating material of a fluororesin is used. In the fluororesin coating material, the microparticles of the fluororesin form a so-called dispersion liquid, in which the microparticles are dispersed in a solvent using a surfactant or the like. Fluororesin dispersion liquids are also commercially available and can be easily purchased. This dispersion liquid is supplied to a spraying machine is sprayed into a mist form under a gas pressure of air or the like. If necessary, a member having an elastic layer that has been adhesive-treated with a primer or the like as necessary is arranged at a position facing the spraying machine, and while this member is rotated at a constant speed, the spraying machine is moved horizontally in the axial direction of the substrate. Thereby, a coating film of the fluororesin coating material can be evenly formed on the surface of the elastic layer. As the member having a fluororesin coating film formed thereon as such is heated to a temperature higher than or equal to the melting point of the fluororesin coating film using a heating unit such as an electric furnace, a fluororesin surface layer can be formed.

(5) Method for Producing Electrophotographic Member

The electrophotographic member according to an embodiment of the present invention can be formed by a process of forming a coating film of the addition-curable liquid silicone rubber mixture according to an embodiment of the present invention on the outer circumferential surface of a substrate, that is, directly on the surface of a substrate or on the surface of another layer that is provided on the surface of the substrate, curing the addition-curable liquid silicone rubber in the coating film, and thereby forming an elastic layer. Furthermore, if necessary, a process of forming a surface layer (release layer) or a sliding layer can also be included, if necessary.

(6) Fixing Apparatus

The fixing apparatus according to an embodiment of the present invention will be specifically explained.

Figure 4:
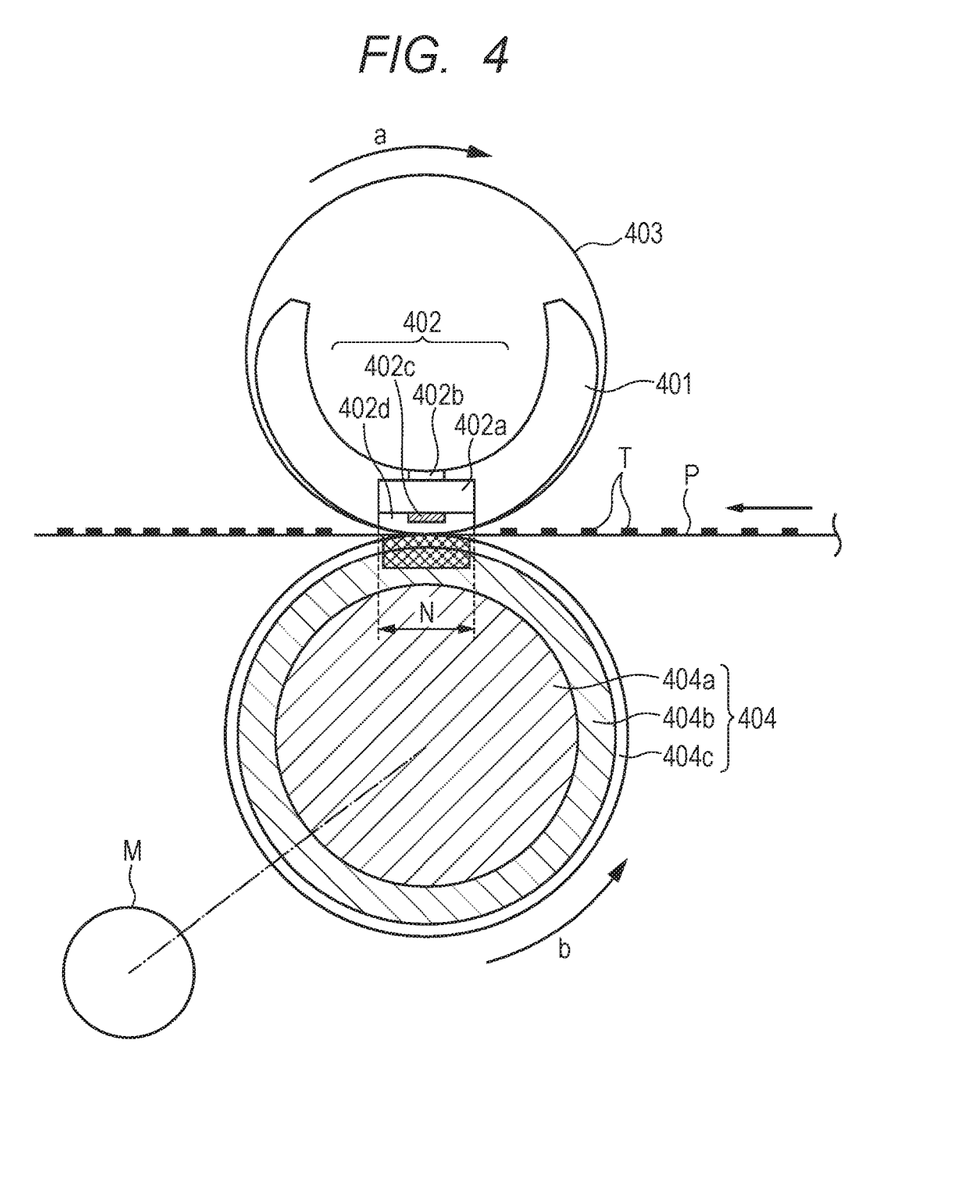
FIG. 4 is an explanatory diagram illustrating a fixing apparatus according to an embodiment of the present invention.

FIG. 4 is a cross-sectional view according to an embodiment of a fixing apparatus. This fixing apparatus is a so-called on-demand type thermal fixing apparatus, and is a thermal fixing apparatus of a film heating type using a ceramic heater as a heat source. In the following description, an on-demand type thermal fixing apparatus will be taken as an example, and an outline of the configuration thereof will be explained. Meanwhile, the fixing apparatus according to the present invention is not intended to be limited to this form, and the fixing apparatus can also be applied to a heat roll type fixing apparatus using a halogen heater as a heat source, or a fixing apparatus of an induction heating (IH) system that causes the member itself to generate heat by conducting electricity through a coil.

In FIG. 4, a film guide member 401 is a gutter-shaped member having an approximately semicircular arc-shaped transverse cross-section, and has a horizontally long shape in which the direction parallel to the longitudinal direction of a rotating body for pressing 404 is designated as the width direction.

A heater 402 is a horizontally long heater accommodated and retained inside the gutter formed along the width direction approximately at the center of the lower surface of the film guide member 401. A belt for electrophotography 403 according to an embodiment of the present invention is externally fitted on the film guide member 401 equipped with the heater 402. Meanwhile, the heater 402 and the belt for electrophotography 403 are constituent elements of the heating unit of the fixing apparatus according to FIG. 4, and the heater 402 is a member for heating the belt for electrophotography 403, which functions as a heating member that is intended to be directly brought into contact with toner and heat the toner. Furthermore, the heater 402 is arranged on the inner side of the belt for electrophotography 403, in contact with the (inner circumferential surface of the) substrate of the belt for electrophotography 403 (having an endless belt shape).

The film guide member 401 is, for example, a molded article formed from a heat-resistant resin such as polyphenylene sulfide (PPS) or a liquid crystal polymer.

The heater 402 has a configuration provided with, for example, a heating resistor on a ceramic board. The heater 402 has a horizontally long thin plate-shaped heater board 402a made of alumina; and a linear or narrow band-shaped electric heat generator (heating resistor) 402c made of Ag/Pd, the electric heat generator being formed and provided on the surface side (film sliding surface side) of the heater board 402a along the longitudinal direction of the heater board 402a. Furthermore, the heater 402 has a thin surface protecting layer 402d made of glass, which covers and protects the electric heat generator 402c. The back surface side of the heater board 402a is in contact with a thermistor (thermometric element) 402b. The heater 402 can be controlled such that the temperature is rapidly increased by supplying electric power to the electric heat generator 402c, and then the predetermined fixing temperature is maintained by a power control unit (not shown in the diagram) including the thermometric element 402b. The fixing temperature is the target temperature of the surface of the heating member (belt for electrophotography), and is appropriately set according to the printing speed, the type of paper, the configuration of the heating member, and the type of toner. A general fixing temperature is from 150° C. to 200° C.

The rotating body for pressing (pressing member) 404 is arranged below the heater 402 so as to face the heater 402, and the rotating body for pressing 404 is pressure-contacted to the heater 402, with the belt for electrophotography (Heating member) 403 interposed therebetween. The rotating body for pressing 404 is composed of a substrate 404a, an elastic layer 404b, and a surface layer 404c.

The rotating body for pressing 404 is pressed against the surface protecting layer 402d of the heater 402, with the belt for electrophotography 403 interposed therebetween, by a predetermined pressing mechanism (not shown in the diagram). The elastic layer 404b of the rotating body for pressing 404 is elastically deformed in accordance with the pressing force, and a nip N having a predetermined width that is required for heat fixing of an unfixed toner image T is formed between the surface of the rotating body for pressing 404 and the surface of the belt for electrophotography 403. The pressing force is appropriately set in accordance with the type of paper as an object of product, size, the type of toner, and the configuration of the fixing apparatus. Usually, the pressing force is set to a value of about 10 kgf (98 N) to 70 kgf (686 N). When a recording material P as a material to be heated is introduced into the nip N, and the recording material P is sandwiched and conveyed, the recording material P is heated. The rotating body for pressing 404 is driven to rotate in the anticlockwise direction shown by the arrow b at a predetermined circumferential speed, when the driving force of a driving source M is transferred via gears (power transmission mechanism) that are not shown in the diagram. Regarding the belt for electrophotography 403, as the rotating body for pressing 404 is driven to rotate in the anticlockwise direction shown by the arrow b at the time of image forming, the belt for electrophotography 403 follows the rotation of the rotating body for pressing 404 and rotates in the direction of the arrow a.

According to an embodiment of the present invention, an electrophotographic member including an elastic layer having high thermal conductivity in the thickness direction, the elastic layer containing graphite (graphite particles) dispersed in a silicone rubber, can be obtained. Furthermore, according to another embodiment of the present invention, an addition-curable liquid silicone rubber mixture having sufficient curability can be obtained.

According to still another embodiment of the present invention, a fixing apparatus that can form a high-quality electrophotographic image can be obtained.

EXAMPLES

Hereinafter, the present invention will be more specifically described using Examples.

Example 1

(1) Preparation of Addition-Curable Liquid Silicone Rubber Mixture 100 parts by mass of a silicone polymer having an unsaturated aliphatic group at both ends (weight average molecular weight: 28,000, kinematic viscosity: 1,000 mm$^2$/sec; hereinafter, referred to as "Vi-1") was prepared as component (a). This silicone polymer is a silicone polymer in which $R_2$ in Structural Formula 5 is a vinyl group, and the amount of vinyl groups introduced into the two ends is 0.5 mol % as a ratio with respect to silicon atoms in Vi-1.

Subsequently, 11.0 parts by mass of a silicone polymer having active hydrogen groups bonded to silicon (weight average molecular weight: 60,000, kinematic viscosity: 9,000 mm$^2$/sec; hereinafter, referred to as "SiH-1") as component (b) was measured and added to Vi-1. Meanwhile, this silicone polymer as component (b) is a silicone polymer in which $R_7$ in Structural Formula 6 is a methyl group, and the amount of active hydrogen groups bonded to silicon atoms is 6.0 mol % as a ratio with respect to silicon atoms in SiH-1.

Furthermore, 0.15 parts by mass of a hydrosilylation catalyst (platinum catalyst: a 2.0 mass % solution of platinum-carbonylcyclovinylmethylsiloxane complex in vinylmethylcyclosiloxane was added to the mixture of component (a) and component (b), and the resulting mixture was sufficiently mixed. Thus, a base polymer (addition-curable liquid silicone rubber) was obtained.

Into this base polymer, 63 parts by mass of graphite particles a (trade name: UF-G30, manufactured by Showa Denko K.K., average particle size: 10 μm, DBP oil absorption number: 87 cm$^3$/100 g) were incorporated, and the resulting mixture was sufficiently mixed. Thus, an addition-curable liquid silicone rubber mixture incorporated with 20% by volume of graphite particles was obtained.

(2) Production of Fixing Belt

Next, a fixing belt was produced as follows, using the addition-curable liquid silicone rubber mixture thus obtained.

As a substrate, an endless sleeve made of electroformed nickel and having an inner diameter of 55 mm, a width of 420 mm, and a thickness of 65 μm was prepared. During a series of production processes, the endless sleeve was handled by inserting a core inside the sleeve.

First, a primer (trade name: DY39-051 A/B, manufactured by Dow Corning-Toray Co., Ltd.) was approximately uniformly applied on the outer circumferential surface of the substrate, the solvent was dried, and then a firing treatment was performed for 30 minutes in an electric furnace at 160° C.

On the primer-treated substrate, the addition-curable liquid silicone rubber mixture was applied to a thickness of 450 μm by a ring coating method. This endless belt having the silicone rubber mixture applied thereon was heated for 1 minute in an electric furnace at 160° C. (primary curing) and then was heated for 4 hours in an electric furnace set at 200° C., and thereby the silicone rubber mixture was cured (secondary curing).

Next, while the surface of the endless belt thus obtained was rotated at a movement speed of 20 mm/sec in the circumferential direction, the secondary cured silicone rubber mixture surface was irradiated with ultraviolet radiation using an ultraviolet lamp provided at a distance of 10 mm from the surface. Regarding the ultraviolet lamp, a low-pressure mercury ultraviolet lamp (trade name: GLQ500US/11, manufactured by Toshiba Lighting and Technology Corp. (formerly: Harison Toshiba Lighting Corp.) was used, and an elastic layer was formed by performing irradiation for 5 minutes at 100° C. in an air atmosphere.

Next, the endless belt was cooled to room temperature, and then an addition-curable silicone rubber adhesive (trade name: SE1819CV A/B, manufactured by Dow Corning Toray Co., Ltd.) was approximately uniformly applied to a thickness of 20 μm on the surface of the elastic layer of this endless belt.

Next, a fluororesin tube (trade name KURAFLON-LT, manufactured by Kurabo Industries, Ltd.) having an inner diameter of 54 mm and a thickness of 40 μm was laminated on this adhesive. Subsequently, any excessive adhesive was pulled out from between the elastic layer and the fluororesin tube by uniformly pulling the belt surface from above the fluororesin tube, so that the excessive adhesive would become sufficiently thin.

The endless belt thus obtained was heated for 1 hour in an electric furnace set at 200° C., thereby the adhesive was cured, and thus the fluororesin tube (surface layer) was fixed onto the elastic layer. The two ends of the endless belt thus obtained were cut, and a fixing belt having a width of 348 mm was obtained.

(3) Evaluation of Characteristics of Fixing Belt (Thermal Conductivity and Modulus in Tension of Elastic Layer)

Firstly, a primer treatment was carried out on a substrate by the same method as the method for producing the fixing belt, and then an elastic layer having a thickness of 450 μm (elastic layer after secondary curing) was formed by a ring coating method.

(3-1) Thermal Conductivity in Thickness Direction of Elastic Layer

The thermal conductivity (λ) in the thickness direction of the elastic layer was calculated by the following Calculation Formula 2.

$$\lambda = \alpha \times C_p \times \rho \quad \text{Calculation Formula 2}$$

wherein in Calculation Formula 2, λ represents the thermal conductivity (W/(m·K)) in the thickness direction of the elastic layer; α represents the thermal diffusivity (mm²/sec) in the thickness; $C_p$ represents the specific heat at constant pressure (J/(g·K)); and ρ represents the true density (g/cm³).

Here, the respective values of the thermal diffusivity in the thickness, the specific heat at constant pressure, and the true density of the elastic layer were determined by the following methods.

Thermal Diffusivity (α)

The thermal diffusivity in the thickness direction of the elastic layer was measured under the conditions of room temperature (25° C.), using a periodic heating method thermal properties analyzer (trade name: FTC-1, manufactured by Ulvac-Riko, Inc.). Regarding the sample specimen, a 250-μm portion of the elastic layer obtained by excluding a 100-μm portion on the surface layer side and a 100-μm portion on the substrate side from 450 μm of the elastic layer, was cut out with a cutter into a sample specimen having an area of 8×12 mm and a thickness of 250 μm. Five sample specimens in total were produced. For each sample, measurement was made five times in total, and the average value of the five samples was 0.88 mm²/sec.

Specific Heat at Constant Pressure ($C_p$)

The specific heat at constant pressure of the elastic layer was measured using a differential scanning calorimetric analyzer (trade name: DSC823e, manufactured by Mettler Toledo International, Inc.).

Specifically, aluminum pans were used as a pan for sample and a pan for reference. First, as the blank measurement, measurement was performed by a program of maintaining both the pans in a blank state at a constant temperature of 15° C. for 10 minutes, subsequently increasing the temperature up to 215° C. at a rate of temperature increase of 10° C./min, and maintaining the pans at a constant temperature of 215° C. for 10 minutes. Next, 10 mg of synthetic sapphire having a known specific heat at constant pressure was used as a reference material, and measurement was performed by the same program. Next, 10 mg of a measurement sample, which was the same amount as the amount of the reference sapphire, was cut out from the elastic layer part, subsequently the measurement sample was mounted on the pan for sample, and then measurement was performed by the same program. These measurement results were analyzed using a specific heat analysis software program attached to the differential scanning calorimetric analyzer, and the specific heat at constant pressure ($C_p$) at 25° C. was calculated from the arithmetic mean value of five measurements. The specific heat at constant pressure of the elastic layer was 1.03 J/(g·K).

True Density (ρ)

The true density of the elastic layer was measured using a dry automatic densitometer (trade name: ACUPIC 1330-01, manufactured by Shimadzu Corp.).

Specifically, a sample cell having a volume of 10 cm³ was used, and a sample was cut out from the elastic layer so as to fill 80% of the cell volume and was introduced into the sample cell. The mass of this sample was measured, and then the cell was mounted in the measurement unit inside the apparatus. The system was purged ten times using helium gas as a gas for measurement, and the volume was measured ten times. The true density (ρ) was calculated from the mass of the sample and the volume thus measured. The true density of the elastic layer was 1.24 g/cm³.

(3-2) Modulus in Tension of Elastic Layer

In order to check that the elastic layer was sufficiently cured, the modulus in tension of the elastic layer was measured.

Specifically, the elastic layer was cut out into dumbbell shape using a punching tool, and thus the sample was cut into a size of 20 mm in length, 4 mm in width, and 300 μm in thickness. Next, the elastic layer thus cut out was mounted on the attachment for measuring the modulus in tension of a kinematic viscoelasticity analyzer (trade name: STROGRAPH EII, manufactured by UBM plc), and the modulus in tension (MPa) was measured.

(4) Evaluation of Fixing Belt

The fixing belt obtained by the method described in (2) was mounted as a heating member in a fixing apparatus unit of an electrophotographic image forming apparatus (trade name: IMAGEPRESS C800, manufactured by Canon, Inc.). This fixing apparatus unit was mounted in the electrophotographic image forming apparatus. This electrophotographic image forming apparatus was used, A4-sized paper (trade name: HIGHLY WHITE PAPER GF-0081, basis weight: 81 g/m², manufactured by Canon, Inc.) was arranged for longitudinal feed (shorter sides are parallel to the longitudinal direction of the fixing belt), and 1,000 sheets of image for evaluation were continuously printed. Regarding the image for evaluation, an image having cyan toner and magenta toner areas formed over the entire surface of the A4-sized paper at a density of 100% was used. An observation of the 1,000$^{th}$ image for evaluation was made by visual inspection. Furthermore, at the time point at which continuous printing of 1,000 sheets of the image for evaluation was completed, an observation of the fixing belt was made by visual inspection. The observation results were evaluated according to the following criteria.

(Evaluation Criteria)

Grade A: Defects attributed to fixing failure are not recognized in the 1,000th sheet of image. Furthermore, in the fixing belt after continuous printing of 1,000 sheets of the image for evaluation, detachment of the elastic layer from the substrate or damage of the elastic layer is not recognized.

Grade B: Defects attributed to fixing failure are recognized in the 1,000th sheet of image. Alternatively, in the fixing belt after continuous printing of 1,000 sheets of the image for evaluation, detachment of the elastic layer from the substrate or damage of the elastic layer is recognized.

Examples 2 to 11 and Comparative Examples 1 to 4

Fixing belts were produced by a method similar to that used in Example 1, except that a silicone polymer having an unsaturated aliphatic group (Vi), a silicone polymer having active hydrogen groups bonded to silicon (SiH), and graphite particles, all of the components meeting the requirements on the type, physical properties and the filling amount indicated in Table 1, were used. For the fixing belts thus obtained, the evaluations of (3) and (4) were carried out in the same manner as in Example 1. The results are respectively presented in Table 1. Here, in Comparative Examples 1 to 4, since the elastic layer was not sufficiently cured due to defective curing, the thermal conductivity in the thickness and the modulus in tension were not measured in all cases. Furthermore, the fixing belts according to Comparative Examples 1 to 4 were not submitted to evaluation (4).

Meanwhile, the weight average molecular weight, kinematic viscosity, and the amount of active hydrogen groups relative to silicon atoms of the silicone polymer having active hydrogen groups bonded to silicon (SiH) shown in Table 1 were as follows.

SiH-2: (weight average molecular weight: 6,000, kinematic viscosity: 130 mm$^2$/sec, amount of active hydrogen groups relative to silicon atoms: 7.5 mol % introduced)

SiH-3: (weight average molecular weight: 2,000, kinematic viscosity: 35 mm$^2$/sec, amount of active hydrogen groups relative to silicon atoms: 27.5 mol % introduced) These silicone polymers are silicone polymers in which $R_7$ in Structural Formula 6 is a methyl group.

In regard to Examples 4 to 11 and Comparative Examples 2 to 4, graphite particles described below were respectively used.

Examples 4 to 6 and Comparative Example 2: graphite particles b (trade name: SNE-10G, manufactured by SEC Carbon, Ltd., average particle size: 11 μm, DBP oil absorption number: 140 cm$^3$/100 g)

Examples 7 to 9 and Comparative Example 3: graphite particles c (trade name: SNO-5, manufactured by SEC Carbon, Ltd., average particle size: 5 μm, DBP oil absorption number: 105 cm$^3$/100 g)

Examples 10 and 11 and Comparative Example 4: graphite particles d (trade name: SGP-10, manufactured by SEC Carbon, Ltd., average particle size: 10 μm, DBP oil absorption number: 83 cm$^3$/100 g)

TABLE 1

| | Addition-curable liquid silicone rubber | | | | Graphite particles | | | | | Elastic layer | | |
|---|---|---|---|---|---|---|---|---|---|---|---|---|
| | Vi | | SiH | | | | | | | | | |
| | Type | Filling amount (parts by mass) | Type | Filling amount (parts by mass) | Type | DBP oil absorption number (cm$^3$/100 g) | Particle size (mm) | Filling amount (parts by mass) | Filling amount (% by volume) | Thermal conductivity in thickness direction (W/(m·K)) | Modulus in tension (MPa) | Fixing belt Evaluation grade |
| Example 1 | Vi-1 | 100 | SiH-1 | 11.0 | a | 87 | 10 | 63 | 20% | 1.12 | 0.28 | A |
| Example 2 | | | | | | | | 78 | 24% | 1.31 | 0.35 | A |
| Example 3 | | | | | | | | 110 | 30% | 1.62 | 0.46 | A |
| Example 4 | | | | | b | 140 | 11 | 38 | 13% | 1.30 | 0.76 | A |
| Example 5 | | | | | | | | 57 | 18% | 1.93 | 1.53 | A |
| Example 6 | | | | | | | | 85 | 25% | 4.85 | 2.26 | A |
| Example 7 | | | | | c | 105 | 5 | 50 | 17% | 1.12 | 0.26 | A |
| Example 8 | | | | | | | | 75 | 23% | 2.25 | 0.39 | A |
| Example 9 | | | | | | | | 110 | 30% | 3.71 | 0.62 | A |
| Example 10 | | | SiH-2 | 9.2 | d | 83 | 10 | 75 | 23% | 1.22 | 0.37 | A |
| Example 11 | | | | | | | | 108 | 30% | 1.49 | 0.52 | A |
| Comparative Example 1 | | | SiH-3 | 2.0 | a | 87 | 10 | 63 | 21% | — | — | — |
| Comparative Example 2 | | | | | b | 140 | 11 | 35 | 13% | — | — | — |
| Comparative Example 3 | | | | | c | 105 | 5 | 50 | 18% | — | — | — |
| Comparative Example 4 | | | | | d | 83 | 10 | 63 | 21% | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014477, filed Jan. 30, 2017, and Japanese Patent Application No. 2017-246304, filed Dec. 22, 2017, which are hereby incorporated by reference herein in their entirety.

What is claimed is:

1. An electrophotographic member, comprising:
a substrate; and
an elastic layer on the substrate,
wherein the elastic layer contains a cured product of an addition-curable liquid silicone rubber mixture including graphite particles, wherein the graphite particles have a dibutyl phthalate (DBP) oil absorption number of from 80 cm³/100 g to 150 cm³/100 g, wherein the elastic layer has a thermal conductivity in a thickness direction of from 1.1 W/(m·K) to 5.0 W/(m·K), and wherein the elastic layer has a modulus in tension of from 0.1 MPa to 4.0 MPa.

2. The electrophotographic member according to claim 1, wherein a content of the graphite particles in the elastic layer is from 13% by volume to 30% by volume with respect to a total volume of the elastic layer.

3. The electrophotographic member according to claim 1, wherein the graphite particles have an average particle size of from 3 μm to 40 μm.

4. The electrophotographic member according to claim 1, having an endless belt shape, wherein the substrate has an endless belt shape, and the elastic layer is positioned on the outer circumferential surface of the substrate having the endless belt shape.

5. The electrophotographic member according to claim 4, wherein a thickness of the elastic layer is from 0.1 mm to 1.0 mm.

6. The electrophotographic member according to claim 4, further comprising a surface layer on an outer circumferential surface of the elastic layer.

7. The electrophotographic member according to claim 6, wherein a thickness of the surface layer is from 10 μm to 100 μm.

8. An addition-curable liquid silicone rubber mixture, comprising an organopolysiloxane having an unsaturated aliphatic group, an organopolysiloxane having an active hydrogen bonded to silicon, a catalyst, and graphite particles, wherein the graphite particles have a dibutyl phthalate (DBP) oil absorption number of from 80 cm³/100 g to 150 cm³/100 g, and wherein the organopolysiloxane having the active hydrogen bonded to silicon has a weight average molecular weight of from 5,500 to 65,000.

9. The addition-curable liquid silicone rubber mixture according to claim 8, wherein a content of the graphite particles in the addition-curable liquid silicone rubber mixture is from 13% by volume to 30% by volume.

10. The addition-curable liquid silicone rubber mixture according to claim 8, wherein the graphite particles have an average particle size of from 3 μm to 40 μm.

11. The addition-curable liquid silicone rubber mixture according to claim 8, wherein the organopolysiloxane having the active hydrogen bonded to silicon has the weight average molecular weight of from 6,000 to 60,000.

12. The addition-curable liquid silicone rubber mixture according to claim 8, wherein the organopolysiloxane having the active hydrogen bonded to silicon has a kinematic viscosity at 25° C. of from 130 mm²/sec to 9,000 mm²/sec.

13. The addition-curable liquid silicone rubber mixture according to claim 8, wherein an amount of active hydrogen bonded to silicon in the organopolysiloxane having the active hydrogen bonded to silicon is from 1 mol % to 10 mol % with respect to 1 mol of silicon.

14. The addition-curable liquid silicone rubber mixture according to claim 8, wherein a weight average molecular weight of the organopolysiloxane having the unsaturated aliphatic group is from 20,000 to 80,000.

15. The addition-curable liquid silicone rubber mixture according to claim 8, wherein a kinematic viscosity at a temperature of 25° C. of the organopolysiloxane having the unsaturated aliphatic group is from 1,000 to 30,000 mm²/sec.

16. A fixing apparatus comprising a heating member and a pressing member arranged to face the heating member, wherein the heating member is an electrophotographic member comprising a substrate and an elastic layer on the substrate, wherein the elastic layer contains a cured product of an addition-curable liquid silicone rubber mixture including graphite particles, wherein the graphite particles have a dibutyl phthalate (DBP) oil absorption number of from 80 cm³/100 g to 150 cm³/100 g, wherein the elastic layer has a thermal conductivity in a thickness direction of from 1.1 W/(m·K) to 5.0 W/(m·K), and wherein the elastic layer has a modulus in tension of from 0.1 MPa to 4.0 MPa.

17. The fixing apparatus according to claim 16, wherein the electrophotographic member has an endless belt shape, wherein the substrate has an endless belt shape, wherein the elastic layer is positioned on an outer circumferential surface of the substrate, and wherein a heater is arranged to be in contact with an inner circumferential surface of the substrate.

18. The fixing apparatus according to claim 16, wherein a content of the graphite particles in the elastic layer is from 13% by volume to 30% by volume.

19. The fixing apparatus according to claim 16, wherein the graphite particles have an average particle size of from 3 μm to 40 μm.

20. The electrophotographic member according to claim 1, wherein the graphite particles are of a hexagonal plate-shaped crystal form.

* * * * *